(12) United States Patent
Sun et al.

(10) Patent No.: US 8,278,369 B2
(45) Date of Patent: Oct. 2, 2012

(54) EPOXY-BASED ANTISKID ADHESIVE AND PREPARATION THEREOF

(75) Inventors: Danjiu Sun, Wuhan (CN); Shuangfeng Wu, Wuhan (CN); Yingfan Xiang, Wuhan (CN); Kunwen Du, Wuhan (CN)

(73) Assignee: Wuhan Keda Marble Protective Materials Co., Ltd., Wuhan (CN)

( * ) Notice: Subject to any disclaimer, the term of this patent is extended or adjusted under 35 U.S.C. 154(b) by 197 days.

(21) Appl. No.: 12/778,266

(22) Filed: May 12, 2010

(65) Prior Publication Data
US 2010/0222456 A1   Sep. 2, 2010

Related U.S. Application Data

(63) Continuation of application No. PCT/CN2008/072223, filed on Sep. 1, 2008.

(30) Foreign Application Priority Data
Nov. 12, 2007   (CN) .......................... 2007 1 0168330

(51) Int. Cl.
  *C08J 5/14*   (2006.01)

(52) U.S. Cl. ......... 523/150; 523/322; 524/417; 524/114
(58) Field of Classification Search ................... 523/150
See application file for complete search history.

(56) References Cited

FOREIGN PATENT DOCUMENTS
WO   WO 2005/063880   *  7/2005
* cited by examiner

*Primary Examiner* — Doris Lee
(74) *Attorney, Agent, or Firm* — Matthias Scholl P.C.; Matthias Scholl

(57) ABSTRACT

An epoxy-based antiskid adhesive having component A and component B, the component A having 1) between 20 and 35 parts of an epoxy resin; 2) between 0.5 and 3 parts of a diluting agent; 3) between 1 and 5 parts of silica; 4) between 20 and 60 parts of quartz sand; 5) between 1 and 6 parts of quartz powder; 6) between 1 and 10 parts of an active calcium; and 7) between 1 and 5 parts of triple superphosphate; and the component B having 1) between 20 and 40 parts of an organic compound-modified amine; 2) between 1 and 5 parts of an accelerator; 3) between 0 and 3 parts of a coupling agent; 4) between 5 and 10 parts of silica; 5) between 20 and 50 parts of quartz sand; 6) between 1 and 10 parts of quartz powder; and 7) between 1 and 10 parts of silica fume.

13 Claims, No Drawings

EPOXY-BASED ANTISKID ADHESIVE AND PREPARATION THEREOF

CROSS-REFERENCE TO RELATED APPLICATIONS

This application is a continuation of International Patent Application No. PCT/CN2008/072223 with an international filing date of Sep. 1, 2008, designating the United States, now pending, and further claims priority benefits to Chinese Patent Application No. 200710168330.1 filed Nov. 12, 2007. The contents of all of the aforementioned applications, including any intervening amendments thereto, are incorporated herein by reference.

BACKGROUND OF THE INVENTION

1. Field of the Invention

The invention relates to an antiskid adhesive and a preparation method thereof, and more particularly to an epoxy-based antiskid adhesive and a preparation method thereof.

2. Description of the Related Art

Conventional antiskid products including antiskid coatings, antiskid agents, and antiskid belts are widely used indoors but not suitable for outdoor environment, which means its application scope is very limited. A common antiskid method outdoors is to slot an antiskid area or insert a copper bar after slotting an antiskid area. However, the method destroys the surface of the substrate, and thereby the substrate is easy to fall off, the antiskid effect is bad, and the service life is short. Additionally, with daily decrease of metal resources, non-ferrous metals including copper is more and more expensive, so it is urgent to develop an antiskid product with low resource consumption.

Epoxy resin is a thermosetting synthetic resin having two or more active epoxy groups and with aliphatic, alicyclic, or aromatic carbon bond as the main chain and can be solidified with a variety of amine as curing agents. With advantages such as easy processing and high performance after being cured, epoxy resins have been widely used in adhesives. As an important material of membrane formation of heavy-duty coatings, epoxy resins have outstanding adhesion, good corrosion resistance, low cure shrinkage, temperature resistance, and chemical resistance, and can effectively resist the penetration of a variety of media. Furthermore, epoxy resins can be applied even in a harsh environment and meet the design requirement for coating thickness and structure. Epoxy resins can be made into anti-corrosion coatings by modifying epoxy structure, alloying epoxy, filling in inorganic fillers, and modifying expanding monomers. Epoxy coating has excellent physical and mechanical properties, such as adhesion, chemical resistance, oil resistance, particularly alkali resistance, and thereby epoxy resins can be widely used as the surface adhesive of stone, metal, cement, wood, and so on.

SUMMARY OF THE INVENTION

In view of the above-described problems, it is one objective of the invention to provide an epoxy-based antiskid adhesive that has good wear resistance and age resistance and can be used outdoors.

It is another objective of the invention to provide a method of preparation of an epoxy-based antiskid adhesive that has good wear resistance and age resistance and can be used outdoors.

To achieve the above objectives, in accordance with one embodiment of the invention, there is provided an epoxy-based antiskid adhesive comprising component A and component B, wherein the component A comprises 1) between 20 and 35 parts of an epoxy resin;
2) between 0.5 and 3 parts of a diluting agent;
3) between 1 and 5 parts of silica;
4) between 20 and 60 parts of quartz sand;
5) between 1 and 6 parts of quartz powder;
6) between 1 and 10 parts of an active calcium; and
7) between 1 and 5 parts of triple superphosphate;
and the component B comprises
1) between 20 and 40 parts of an organic compound-modified amine;
2) between 1 and 5 parts of an accelerator;
3) between 0 and 3 parts of a coupling agent;
4) between 5 and 10 parts of silica;
5) between 20 and 50 parts of quartz sand;
6) between 1 and 10 parts of quartz powder; and
7) between 1 and 10 parts of silica fume.

In a class of this embodiment, the component A comprises
1) between 25 and 30 parts of the epoxy resin;
2) between 1 and 3 parts of the diluting agent;
3) between 1 and 3 parts of silica;
4) between 40 and 50 parts of quartz sand;
5) between 2 and 5 parts of quartz powder;
6) between 6 and 8 parts of the active calcium; and
7) between 2 and 4 parts of triple superphosphate;
and the component B comprises
1) between 30 and 35 parts of the organic compound-modified amine;
2) between 2 and 5 parts of the accelerator;
3) between 4 and 6 parts of silica;
4) between 40 and 45 parts of quartz sand;
5) between 5 and 10 parts of quartz powder; and
6) between 5 and 10 parts of silica fume.

In a class of this embodiment, the component A comprises
1) 30 parts of the epoxy resin;
2) one part of the diluting agent;
3) 3 parts of silica;
4) 50 parts of quartz sand;
5) 5 parts of quartz powder;
6) 8 parts of an active calcium; and
7) 3 parts of triple superphosphate;
and the component B comprises
1) 30 parts of the organic compound-modified amine;
2) 3 parts of the accelerator;
3) one part of the coupling agent;
4) 5 parts of silica;
5) 45 parts of quartz sand;
6) 10 parts of quartz powder; and
7) 5 parts of silica fume.

In a class of this embodiment, the coupling agent is vinyl silane, 3-propyltrimethoxysilane, 3-aminopropyl triethoxysilane, anilinomethyltriethoxysilane, or a mixture thereof.

In a class of this embodiment, the diluting agent is epoxypropane nonylether, propylene oxide $C_{12-14}$, 5-(tridecyloxy)pentan-2-one, polyglycidyl ether, or a mixture thereof.

In a class of this embodiment, the epoxy resin is an epoxy resin of bisphenol A diglycidyl ether, an epoxy resin of bisphenol F diglycidyl ether epoxy resin, or a mixture thereof.

In a class of this embodiment, the organic compound-modified amine is alicyclic amine, low molecular weight of polyamide, isophorone diamine, or a mixture thereof.

In a class of this embodiment, the accelerator is 4-ethyl-1, 6-dimethylpyridine, a,a'-diethyl dibenzylamine, 1,1,4-trimethyl-6-ethoxy-tetrahydroquinoline, 4-nonylphenol, or a mixture thereof.

In a class of this embodiment, the quartz sand is between 40 and 100 mesh.

In accordance with another embodiment of the invention, there is provided a method of preparation of an epoxy-based antiskid adhesive, the epoxy-based antiskid adhesive comprising component A and component B, the component A comprising
1) between 20 and 35 parts of an epoxy resin;
2) between 0.5 and 3 parts of a diluting agent;
3) between 1 and 5 parts of silica;
4) between 20 and 60 parts of quartz sand;
5) between 1 and 6 parts of quartz powder;
6) between 1 and 10 parts of an active calcium; and
7) between 1 and 5 parts of triple superphosphate;
the component B comprising
1) between 20 and 40 parts of an organic compound-modified amine;
2) between 1 and 5 parts of an accelerator;
3) between 0 and 3 parts of a coupling agent;
4) between 5 and 10 parts of silica;
5) between 20 and 50 parts of quartz sand;
6) between 1 and 10 parts of quartz powder; and
7) between 1 and 10 parts of silica fume;
wherein the method comprises the steps of
1) adding silica to a mixture of the epoxy resin and the diluting agent, uniformly dispersing, adding quartz sand, quartz powder, the active calcium, and triple superphosphate at a speed of between 20 and 50 rpm, dispersing for 40 min, and uniformly mixing to yield the component A; and
2) adding silica to a mixture of the accelerator, the coupling agent, and the organic compound-modified amine, uniformly dispersing, adding quartz sand, quartz powder, and silica fume at a speed of between 20 and 50 rpm, dispersing for 40 min, and uniformly mixing to yield the component B.

For the epoxy-based antiskid adhesive of the invention, the epoxy resin is a main ingredient. The silica enhances the sagging of the adhesive so as to form a fixed nonslip area. The quartz sand enhances the roughness of the product so as to form a nonslip surface. The quartz powder, active calcium, triple superphosphate, and silica fume all as fillers enhance the mechanical strength. The organic compound-modified amine functions as a curing agent. The accelerator enhances the curing degree of the epoxy resin. The coupling agent is used to increase the compatibility of the epoxy resin and the fillers. The diluting agent can adjust the viscosity of the product so as to enhance the adhesive force between the product and a substrate.

Based on excellent corrosive resistance of epoxy resins, by modifying an epoxy group with various compounds, filling in inorganic compounds, and adding high-strength and wear-resistant quartz sand, an epoxy-based antiskid coating which can be cured at room temperature and has good adhesion and dimensional stability is formed. The antiskid adhesive can be widely used in outdoor or indoor stair steps, slopes, and entrance or exit of public places, and so on, and the substrate to be applied to is stone, cement, ceramics, wood, and so on.

The antiskid adhesive of the invention adheres to the substrate (such as, stone, cement, ceramics, wood) tightly by chemical bonding force, and the antiskid surface is rough, the antiskid effect is excellent. Furthermore, the raw material of epoxy resin is rich in supply, which reduces the waste of non-renewable resources.

Advantages of the invention are summarized below: the antiskid adhesive has long service life and high adhesive force, is easy for practice, solvent-free, environmentally friendly, and can be widely used indoors and outdoors.

Tests on the epoxy-based antiskid adhesive of the invention show it has excellent properties such as wear resistance, hot-wet resistance, UV age resistance, and resistance of hot and cold alternation. The addition of a coupling agent such as 3-aminopropyl triethoxysilane which has two active groups of amino group and ethoxy group and couples organic polymers and inorganic filler improves the adhesion, strength, moisture resistance, weather resistance, and extends the service life.

Tests on the epoxy-based antiskid adhesive of the invention further show that a mixture of bisphenol A epoxy resin and bisphenol F epoxy resin significantly enhances the comprehensive properties such as tensile strength, flexural strength, and water absorption, particularly when bisphenol F epoxy resin accounts for between 40 and 60 weight %, and thereby the low-temperature crystallization of bisphenol A epoxy resin is avoided. Additionally, alicyclic glycidyl ether epoxy resin, due to its good adhesion, weather resistance, heat resistance, and age resistance, is particularly suitable for places where resistance of hot and cold alternation is a must. In a time when the temperature dropped significantly, especially in a wet construction environment, alicyclic amine as a curing agent is prone to pale and frost, an appropriate choice for the amount and type of an accelerator can weaken the phenomenon. Test still shows although the accelerator speeds up the reaction rate and avoids many side reactions, it will significantly reduce the storage period of basic materials.

The properties such as antiskid effect and wear resistance of the epoxy-based antiskid adhesive of the invention is decided by a variety of factors including but not limited to the type of the epoxy resin and the curing agent, the adhesion thereof, the type of the fillers, the molecular weight and molecular structure of the selected materials.

Tests show the technical index of the epoxy-based antiskid adhesives of the invention is superior to that of existing standards (including the national standards and industry standards). The comparison is listed below:

| No. | Items | Standards | Measured data |
| --- | --- | --- | --- |
| 1 | Pot life (min) | 60-150 | 120 min |
| 2 | Modulus of bending (Mpa) | $\geq 2000$ | 3628.6 |
| 3 | Impact strength (KJ/m$^2$) | $\geq 3$ | 4.8 |
| 4 | Tensile shear strength (Mpa) | $\geq 8$ | 20 |
| 5 | Compression shear strength (Mpa) | $\geq 7$ | 18 |
| 6 | Friction coefficient | / | 0.423 |
| 7 | Cumulative weight loss (g) | / | 0.0372 |

The adopted standard for comparison comprises Epoxy Adhesives Used for Dry-Hanging Stones (JC 887-2001).

The test for Pot life is based on Test 5.6 of GB/T 12954-1991.

The test for Modulus of bending is based on GB/T 2570.

The test for Impact strength is based on GB/T 2571, and small specimens without gaps are adopted.

The test for Tensile shear strength is based on GB/T 7124, and arithmetic mean value from five specimens is practicable.

The test for Compression shear strength is based on Test 6.3.4 of JC/T 547-1994.

The test for Friction coefficient and Cumulative weight loss is based on GB 1244.1-90 Metallic materials wear tests-MM mode wear test.

The component A and component B of the epoxy-based antiskid adhesive of the invention can be packed independently, mixed manually according to a mixing ratio prior to use, and painted on a construction area with a scraper to form a coating. Optionally, the two components can be packed integratedly and mixed with a glue gun. Use instantly upon mixing. The available time of the mixture of the component A and component B is between 100 and 120 min at 25° C./69° F. 12-16 hs later, the surface is cured well enough for walk and 7 days later, the properties thereof are stabilized.

Specifically, here provides a construction method: marking a slippery area with KEDA antiskid belts having thickness of between 1 and 2 mm, uniformly mixing the component A and component B (the ratio is 2:1), painting the mixture with a scraper on the marked area, removing excess adhesives, removing the antiskid belts 10 min later, allowing for curing for 12 hs at 25° C. 7 days later, the mechanical properties of the adhesive are stabilized.

DETAILED DESCRIPTION OF THE EMBODIMENTS

For further illustrating the invention, experiments detailing an epoxy-based antiskid adhesive and a preparation method thereof are described below. It should be noted that the following examples are intended to describe and not to limit the invention.

Example 1

An epoxy-based antiskid adhesive comprises component A and component B. The component A comprises 20 parts of an epoxy resin, 0.5 part of a diluting agent, one part of silica, 20 parts of quartz sand, one part of quartz powder, one part of active calcium, and one part of triple superphosphate. The component B comprises 20 parts of an organic compound-modified amine, one part of an accelerator, 5 parts of silica, 20 parts of quartz sand, one part of quartz powder, and one part of silica fume.

The coupling agent is vinyl silane. The diluting agent is a mixture of epoxypropane nonylether and propylene oxide $C_{12-14}$. The epoxy resin is an epoxy resin of bisphenol A diglycidyl ether. The organic compound-modified amine is alicyclic amine. The accelerator is 4-ethyl-1,6-dimethylpyridine. The quartz sand is 40 mesh.

A method of preparation of the epoxy-based antiskid adhesive comprises the steps of:
1) adding silica to a mixture of the epoxy resin and the diluting agent, uniformly dispersing, adding quartz sand, quartz powder, the active calcium, and triple superphosphate at a speed of between 20 and 50 rpm, dispersing for 40 min, and uniformly mixing to yield the component A; and
2) adding silica to a mixture of the accelerator and the organic compound-modified amine, uniformly dispersing, adding quartz sand, quartz powder, and silica fume at a speed of between 20 and 50 rpm, dispersing for 40 min, and uniformly mixing to yield the component B.

Example 2

An epoxy-based antiskid adhesive comprises component A and component B. The component A comprises 35 parts of an epoxy resin, 3 parts of a diluting agent, 5 parts of silica, 60 parts of quartz sand, 6 parts of quartz powder, 10 parts of active calcium, and 5 parts of triple superphosphate. The component B comprises 40 parts of an organic compound-modified amine, 5 parts of an accelerator, 3 parts of a coupling agent, 10 parts of silica, 50 parts of quartz sand, 10 parts of quartz powder, and 10 parts of silica fume.

The coupling agent is 3-propyltrimethoxysilane. The diluting agent is a mixture of 5-(tridecyloxy)pentan-2-one and polyglycidyl ether. The epoxy resin is an epoxy resin of bisphenol F diglycidyl ether. The organic compound-modified amine is isophorone diamine. The accelerator is a mixture of a,a'-diethyl dibenzylamine and 1,1,4-trimethyl-6-ethoxy-tetrahydroquinoline. The quartz sand is 100 mesh.

A method of preparation of the epoxy-based antiskid adhesive comprises the steps of:
1) adding silica to a mixture of the epoxy resin and the diluting agent, uniformly dispersing, adding quartz sand, quartz powder, the active calcium, and triple superphosphate at a speed of between 20 and 50 rpm, dispersing for 40 min, and uniformly mixing to yield the component A; and
2) adding silica to a mixture of the accelerator, the coupling agent, and the organic compound-modified amine, uniformly dispersing, adding quartz sand, quartz powder, and silica fume at a speed of between 20 and 50 rpm, dispersing for 40 min, and uniformly mixing to yield the component B.

Example 3

An epoxy-based antiskid adhesive comprises component A and component B. The component A comprises 25 parts of an epoxy resin, one part of a diluting agent, one part of silica, 40 parts of quartz sand, 2 parts of quartz powder, 6 parts of active calcium, and 2 parts of triple superphosphate. The component B comprises 30 parts of an organic compound-modified amine, 2 parts of an accelerator, 4 parts of silica, 40 parts of quartz sand, 5 parts of quartz powder, and 5 parts of silica fume.

The coupling agent is a mixture of 3-aminopropyl triethoxysilane and anilinomethyltriethoxysilane. The diluting agent is a mixture of propylene oxide $C_{12-14}$ and 5-(tridecyloxy)pentan-2-one and polyglycidyl ether. The epoxy resin is a mixture of an epoxy resin of bisphenol A diglycidyl ether and an epoxy resin of bisphenol F diglycidyl ether. The organic compound-modified amine is a mixture of low molecular weight of polyamide and isophorone diamine. The accelerator is a mixture of 4-ethyl-1,6-dimethylpyridine, a,a'-diethyl dibenzylamine, 1,1,4-trimethyl-6-ethoxy-tetrahydroquinoline, and 4-nonylphenol. The quartz sand is 80 mesh.

A method of preparation of the epoxy-based antiskid adhesive is the same as that in Example 2.

Example 4

An epoxy-based antiskid adhesive comprises component A and component B. The component A comprises between 25 and 30 parts of an epoxy resin, between 1 and 3 parts of a diluting agent, 3 parts of silica, 50 parts of quartz sand, 5 parts of quartz powder, 8 parts of active calcium, and 4 parts of triple superphosphate. The component B comprises 35 parts of an organic compound-modified amine, 5 parts of an accelerator, 6 parts of silica, 45 parts of quartz sand, 10 parts of quartz powder, and 10 parts of silica fume.

The coupling agent is a mixture of vinyl silane, 3-propyltrimethoxysilane, 3-aminopropyl triethoxysilane, and anilinomethyltriethoxysilane. The diluting agent is a mixture of epoxypropane nonylether, propylene oxide $C_{12-14}$, 5-(tridecyloxy)pentan-2-one, and polyglycidyl ether. The epoxy resin is a mixture of an epoxy resin of bisphenol A diglycidyl ether and an epoxy resin of bisphenol F diglycidyl ether. The organic compound-modified amine is a mixture of alicyclic amine, low molecular weight of polyamide, and isophorone diamine. The accelerator is a mixture of 4-ethyl-1,6-dimethylpyridine, a,a'-diethyl dibenzylamine, 1,1,4-trimethyl-6-ethoxy-tetrahydroquinoline, and 4-nonylphenol. The quartz sand is 60 mesh.

A method of preparation of the epoxy-based antiskid adhesive is the same as that in Example 2.

Example 5

An epoxy-based antiskid adhesive comprises component A and component B. The component A comprises 30 parts of an epoxy resin, one part of a diluting agent, 3 parts of silica, 50 parts of quartz sand, 5 parts of quartz powder, 8 parts of active calcium, and 3 parts of triple superphosphate. The component B comprises 30 parts of an organic compound-modified amine, 3 parts of an accelerator, one part of a coupling agent, 5 parts of silica, 45 parts of quartz sand, 10 parts of quartz powder, and 5 parts of silica fume.

The coupling agent is anilinomethyltriethoxysilane. The diluting agent is polyglycidyl ether. The epoxy resin is an epoxy resin of bisphenol A diglycidyl ether. The organic compound-modified amine is a mixture of alicyclic amine and low molecular weight of polyamide. The accelerator is a mixture of 1,1,4-trimethyl-6-ethoxy-tetrahydroquinoline and 4-nonylphenol. The quartz sand is 70 mesh.

A method of preparation of the epoxy-based antiskid adhesive is the same as that in Example 2.

Example 6

An epoxy-based antiskid adhesive comprises component A and component B. The component A comprises 30 parts of an epoxy resin, 2 parts of a diluting agent, 3 parts of silica, 40 parts of quartz sand, 4 parts of quartz powder, 6 parts of active calcium, and 3 parts of triple superphosphate. The component B comprises 30 parts of an organic compound-modified amine, 3 parts of an accelerator, 2 parts of a coupling agent, 8 parts of silica, 35 parts of quartz sand, 6 parts of quartz powder, and 6 parts of silica fume.

The coupling agent is a mixture of 3-propyltrimethoxysilane and anilinomethyltriethoxysilane. The diluting agent is a mixture of 5-(tridecyloxy)pentan-2-one and polyglycidyl ether. The epoxy resin is an epoxy resin of bisphenol A diglycidyl ether. The organic compound-modified amine is low molecular weight of polyamide. The accelerator is a mixture of a,a'-diethyl dibenzylamine and 4-nonylphenol. The quartz sand is 90 mesh.

A method of preparation of the epoxy-based antiskid adhesive is the same as that in Example 2.

Example 7

An epoxy-based antiskid adhesive comprises component A and component B. The component A comprises 28 parts of an epoxy resin, 2 parts of a diluting agent, 2 parts of silica, 45 parts of quartz sand, 3.5 parts of quartz powder, 7 parts of active calcium, and 3 parts of triple superphosphate. The component B comprises 63 parts of an organic compound-modified amine, 3.5 parts of an accelerator, 5 parts of silica, 83 parts of quartz sand, 8 parts of quartz powder, and 8 parts of silica fume.

The coupling agent is 3-aminopropyl triethoxysilane. The diluting agent is epoxypropane nonylether. The epoxy resin is a mixture of an epoxy resin of bisphenol A diglycidyl ether and an epoxy resin of bisphenol F diglycidyl ether. The organic compound-modified amine is alicyclic amine. The accelerator is 4-ethyl-1,6-dimethylpyridine. The quartz sand is 70 mesh.

A method of preparation of the epoxy-based antiskid adhesive is the same as that in Example 2.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An epoxy-based antiskid adhesive comprising component A and component B, wherein said component A comprises
   1) between 20 and 35 parts of an epoxy resin;
   2) between 0.5 and 3 parts of a diluting agent;
   3) between 1 and 5 parts of silica;
   4) between 20 and 60 parts of quartz sand;
   5) between 1 and 6 parts of quartz powder;
   6) between 1 and 10 parts of an active calcium; and
   7) between 1 and 5 parts of triple superphosphate;
   and said component B comprises
   1) between 20 and 40 parts of an organic compound-modified amine;
   2) between 1 and 5 parts of an accelerator;
   3) between 0 and 3 parts of a coupling agent;
   4) between 5 and 10 parts of silica;
   5) between 20 and 50 parts of quartz sand;
   6) between 1 and 10 parts of quartz powder; and
   7) between 1 and 10 parts of silica fume.

2. The epoxy-based antiskid adhesive of claim 1, wherein said component A comprises
   1) between 25 and 30 parts of said epoxy resin;
   2) between 1 and 3 parts of said diluting agent;
   3) between 1 and 3 parts of said silica;
   4) between 40 and 50 parts of said quartz sand;
   5) between 2 and 5 parts of said quartz powder;
   6) between 6 and 8 parts of said active calcium; and
   7) between 2 and 4 parts of said triple superphosphate;
   and said component B comprises
   1) between 30 and 35 parts of said organic compound-modified amine;
   2) between 2 and 5 parts of said accelerator;
   3) between 4 and 6 parts of said silica;
   4) between 40 and 45 parts of said quartz sand;
   5) between 5 and 10 parts of said quartz powder; and
   6) between 5 and 10 parts of said silica fume.

3. The epoxy-based antiskid adhesive of claim 1, wherein said coupling agent is vinyl silane, 3-propyltrimethoxysilane, 3-aminopropyl triethoxysilane, anilinomethyltriethoxysilane, or a mixture thereof.

4. The epoxy-based antiskid adhesive of claim 1, wherein said diluting agent is epoxypropane nonylether, propylene oxide C12-14, 5-(tridecyloxy)pentan-2-one, polyglycidyl ether, or a mixture thereof.

5. The epoxy-based antiskid adhesive of claim 1, wherein said epoxy resin is an epoxy resin of bisphenol A diglycidyl ether, an epoxy resin of bisphenol F diglycidyl ether, or a mixture thereof.

6. The epoxy-based antiskid adhesive of claim 1, wherein said organic compound-modified amine is alicyclic amine, low molecular weight of polyamide, isophorone diamine, or a mixture thereof.

7. The epoxy-based antiskid adhesive of claim 1, wherein said accelerator is 4-ethyl-1,6-dimethylpyridine, a,a'-diethyl dibenzylamine, 1,1,4-trimethyl-6-ethoxy-tetrahydroquinoline, 4-nonylphenol, or a mixture thereof.

8. The epoxy-based antiskid adhesive of claim 1, wherein said quartz sand is between 40 and 100 mesh.

9. The epoxy-based antiskid adhesive of claim 1, wherein said component A comprises
  1) 30 parts of said epoxy resin;
  2) one part of said diluting agent;
  3) 3 parts of said silica;
  4) 50 parts of said quartz sand;
  5) 5 parts of said quartz powder;
  6) 8 parts of said active calcium; and
  7) 3 parts of said triple superphosphate;
and said component B comprises
  1) 30 parts of said organic compound-modified amine;
  2) 3 parts of said accelerator;
  3) one part of said coupling agent;
  4) 5 parts of said silica;
  5) 45 parts of said quartz sand;
  6) 10 parts of said quartz powder; and
  7) 5 parts of said silica fume.

10. The epoxy-based antiskid adhesive of claim 9, wherein said coupling agent is vinyl silane, 3-propyltrimethoxysilane, 3-aminopropyl triethoxysilane, anilinomethyltriethoxysilane, or a mixture thereof.

11. The epoxy-based antiskid adhesive of claim 9, wherein said diluting agent is epoxypropane nonylether, propylene oxide C12-14, 5-(tridecyloxy)pentan-2-one, polyglycidyl ether, or a mixture thereof.

12. The epoxy-based antiskid adhesive of claim 9, wherein said epoxy resin is an epoxy resin of bisphenol A diglycidyl ether, an epoxy resin of bisphenol F diglycidyl ether, or a mixture thereof.

13. The epoxy-based antiskid adhesive of claim 9, wherein said organic compound-modified amine is alicyclic amine, low molecular weight of polyamide, isophorone diamine, or a mixture thereof.

\* \* \* \* \*